(12) United States Patent
Lee et al.

(10) Patent No.: US 7,737,219 B2
(45) Date of Patent: Jun. 15, 2010

(54) PRESSURE SENSITIVE ADHESIVE COMPOSITION FOR ELECTRO-MAGNETIC SHIELDING FILM AND ELECTRO-MAGNETIC SHIELDING FILTER USING THE SAME

(75) Inventors: Dong-Wook Lee, Busan (KR); In-Cheon Han, Seoul (KR); Jong-Cheol Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/588,921

(22) Filed: Nov. 2, 2009

(65) Prior Publication Data

US 2010/0117037 A1 May 13, 2010

Related U.S. Application Data

(62) Division of application No. 10/527,795, filed as application No. PCT/KR2004/000544 on Mar. 15, 2004, now abandoned.

(30) Foreign Application Priority Data

Mar. 20, 2003 (KR) ....................... 10-2003-0017583

(51) Int. Cl.
*C08F 8/30* (2006.01)
(52) U.S. Cl. ...................... 525/123; 428/343; 313/112; 313/461; 313/477 R; 313/479
(58) Field of Classification Search ................ 525/123; 428/343; 313/112, 461, 477 R, 479
See application file for complete search history.

(56) References Cited

U.S. PATENT DOCUMENTS 4,491,646 A * 1/1985 Gruber et al. ............... 524/558

| | | | |
|---|---|---|---|
| 6,833,665 B2 * | 12/2004 | Wachi et al. | 313/479 |
| 6,965,191 B2 * | 11/2005 | Koike et al. | 313/112 |
| 2003/0017331 A1 * | 1/2003 | Okochi et al. | 428/343 |
| 2003/0085649 A1 * | 5/2003 | Wachi et al. | 313/479 |

FOREIGN PATENT DOCUMENTS

| CN | 1404519 A | 3/2003 |
|---|---|---|
| EP | 1 262 534 A2 | 12/2002 |
| JP | 45-439 | 1/1970 |
| JP | 59-152977 | 8/1984 |
| JP | 2178378 | 7/1990 |
| JP | 08-081658 | 3/1996 |
| JP | 09-040927 | 2/1997 |
| JP | 09-258378 | 10/1997 |
| JP | 10-152658 | 6/1998 |
| JP | 10-338848 | 12/1998 |
| JP | 2000328014 | 11/2000 |
| JP | 2001328849 | 11/2001 |
| JP | 2003013028 | 1/2003 |
| JP | 2003026987 | 1/2003 |
| JP | 2003049135 | 2/2003 |
| JP | 003-119446 | 4/2003 |
| WO | WO 02/50209 A1 | 6/2002 |

* cited by examiner

*Primary Examiner*—Bernard Lipman
(74) *Attorney, Agent, or Firm*—McKenna Long & Aldridge LLP (57) ABSTRACT

The present invention relates to an adhesive composition for an electro-magnetic shielding film and an electro-magnetic shielding filter using the same, and more particularly to an adhesive composition for an electromagnetic shielding film comprising: a) an acrylic copolymer of i) (meth)acrylate ester monomers having $C_1$ to $C_{12}$ alkyl groups and ii) vinylic monomers having hydroxyl groups; and b) a multifunctional isocyanate crosslinking agent. The electro-magnetic shielding filter of the present invention offers good durability because transparentization is performed with an acrylic adhesive composition having no acidic groups, and thus oxidation of copper is prevented.

9 Claims, 5 Drawing Sheets

Air layer

PRESSURE SENSITIVE ADHESIVE COMPOSITION FOR ELECTRO-MAGNETIC SHIELDING FILM AND ELECTRO-MAGNETIC SHIELDING FILTER USING THE SAME

This application is a divisional application of application Ser. No. 10/527,795, filed Nov. 4, 2005, now abandoned, which claims the priority to PCT/KR2004/000544 filed Mar. 15, 2004, which claims benefit to Korean Patent Application No. 10-2003-0017583, filed on Mar. 20, 2003, all of which are hereby incorporated by reference for all purposes as if fully set forth herein.

TECHNICAL FIELD

The present invention relates to an adhesive composition for an electro-magnetic shielding film and an electro-magnetic shielding filter using the same, and more particularly to an adhesive composition for an electro-magnetic shielding film wherein the adhesive contains no acidic groups so that oxidation of copper is prevented and thereby having superior durability, and an electro-magnetic shielding filter using the same.

BACKGROUND ART

Recently, with interest in digital televisions and high-quality wide-screen televisions increasing, development of cathode ray tubes (CRTs), liquid crystal displays (LCDs), and plasma display panels (PDPs) is actively progressing.

CRTs, which are widely used as displays in TVs, are superior in resolution and image quality. However, they are not suitable for wide screens of 40 inches or larger because of size and weight.

LCDs are superior in terms of power consumption and driving voltage, but they are difficult to make into wide screens and are limited in view angle.

PDPs can be made into wide screens of about 60 inches. When manufacturing a PDP device, a partitioned barrier is formed on a bottom plate and phosphor layers of red, green, and blue are formed on the barrier. The bottom plate is then covered by a top plate, so that electrodes of the bottom plate and those of the top plate face each other in parallel. Then, discharge gas is injected therein and the device is sealed. Light radiated from plasma when the gas is discharged is used to transfer images, and the barrier separates each unit cell.

PDP devices are classified into direct current (DC) and alternating current (AC) types. In DC devices, electrodes are exposed to the discharge area, and in AC devices, a dielectric glass layer is formed on electrodes.

Figure 1:
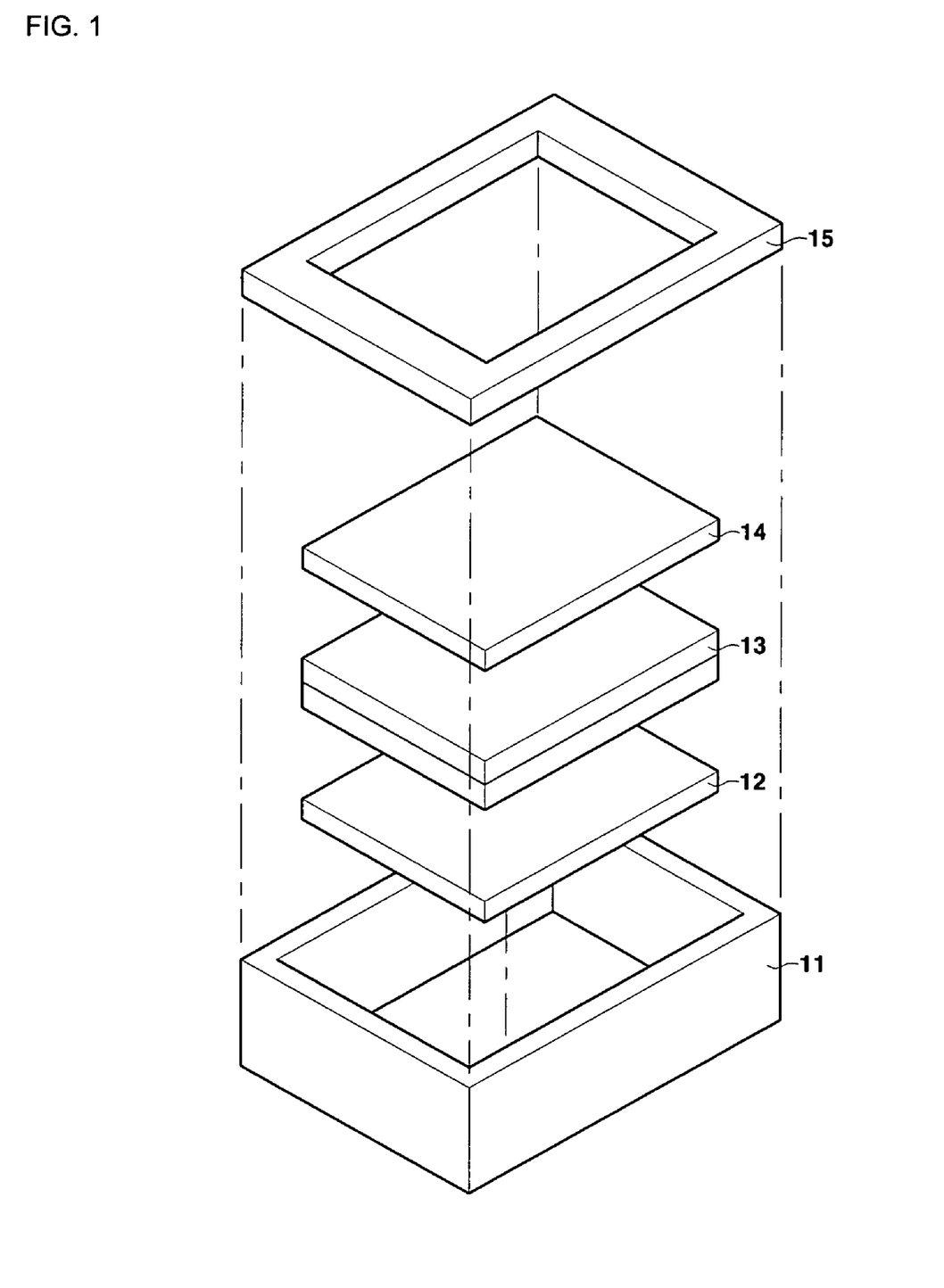
FIG. 1 shows the structure of a plasma display panel.

Referring to FIG. 1, a general PDP comprises a case 11, a cover 15 covering said case 11, a drive circuit board 12 located in said case 11, a panel assembly 13, and an electro-magnetic shielding filter 14. Said electro-magnetic shielding filter 14 is coated with a conducting film made of a conducting material, which offers a grounding path passing through the cover 15 to the case 11, and is placed on a glass plate. That is, an electromagnetic wave generated from the panel assembly 13 is passed through the conducting film of the electro-magnetic shielding filter 14 to the cover 15 and the case 11 before it reaches the user. For this purpose, the conducting film of the electro-magnetic shielding filter 14 is electrically connected to the cover 15 and the case 11.

In addition to shielding electromagnetic waves, said electro-magnetic shielding filter shields near infrared rays, protects the panel from external impact, improves color resolution, prevents reflection, and enhances contrast.

Formerly, transparent conducting films satisfying industrial class A (surface resistance <2.5Ω/□) standard, such as an Ag multi-deposited film, were widely used to manufacture electro-magnetic shielding filter films for plasma display panels. But recently, with the increase in demand for plasma display panels for families, copper etching meshes or conducting fiber meshes that satisfy the class B (surface resistance <1.5Ω/□) standard in which copper or nickel is coated on polyester fiber by electroless plating are being widely used.

Generally, mesh-type electro-magnetic shielding films are manufactured by applying copper foil having a thickness of about 10 μm on a polyethylene terephthalate substrate using a transparent adhesive and etching it to pitch ~300 μm and linewidth ~10 μm.

When this electro-magnetic shielding film is laminated with a functional film such as an antireflection film, an aperture is formed between the two films due to the copper foil mesh. Then, because of the difference in refractive indices of air and the polymer layer, light emergent from the plasma display panel becomes scattered, thereby reducing visibility. Therefore, the aperture should be removed by a process called transparentization.

For transparentization, a method of using a hot melt resin (Japan Patent Publication No. Hei 9-258378), a method of using adhesive, a method of filling a fluid resin (U.S. Pat. No. 6,197,408), and so forth have been developed. Among these, the most simple and widely used method is the method of using adhesive by which transparentization can be attained by applying pressure without an additional process. In transparentization using adhesive, the durability of the electro-magnetic shielding filter largely depends on the component of the adhesive.

In general, rubber, acryl, and silicone are widely used for adhesives. Among these, acrylic adhesives are the most popular for preparing functional adhesive compositions because of various melt properties. General acrylic adhesives have superior adhesivity when pressurized slightly at normal temperature. This is because polymer molecules comprising the adhesives are fluid and sensitive to pressure.

The electro-magnetic shielding filter offers colors with good resolution and image quality because of each functional film. If the filter discolors during use, it cannot offer good resolution and image quality. Therefore, there should be no change in transmittivity and color between before and after a durability test. Especially, color change due to oxidation of the copper mesh under high temperature and high humidity is a serious problem.

The durability of adhesive at the area where it contacts the copper mesh is a problem. Copper looks red in a neutral state, but it turns blue because of $Cu^{2+}$ when oxidized. Therefore, the cause of discoloration of the transparentized adhesive is oxidation of copper.

In widely used acrylic adhesive compositions, several functional groups are used to crosslink the adhesive. Particularly, when monomers having acidic groups (—COON) are used, the acidic groups (—COON) oxidize copper under high temperature and high humidity, thereby discoloring the electro-magnetic shielding filter and reducing color resolution.

| *Description of marks for a main part of drawings* | |
|---|---|
| 11 | case |
| 12 | drive circuit board |
| 13 | panel assembly |
| 14 | electro-magnetic shielding filter |
| 15 | cover |
| 21, 31 | transparent substrate |
| 22, 32 | adhesive layer |
| 23, 33 | layers of copper foil |
| 24, 34 | black screen |
| 25, 35 | adhesive |
| 26, 36 | transparent substrate |
| 27, 37 | reinforcing glass |
| 38 | Color correction layer |
| 39 | near infrared ray shielding layer |
| 40 | near infrared ray shielding layer |

TECHNICAL PROBLEM

It is an object of the present invention to provide an adhesive composition for an electro-magnetic shielding film having superior durability by preventing oxidization of copper, and an electro-magnetic shielding filter using the same.

TECHNICAL SOLUTION

To attain said object, the present invention provides an acrylic adhesive composition for an electro-magnetic shielding film, comprising:

a) an acrylic copolymer of i) (meth)acrylate ester monomers having $C_1$ to $C_{12}$ alkyl groups; and ii) vinylic monomers having hydroxyl groups; and b) a multifunctional isocyanate crosslinking agent.

The present invention also provides an electro-magnetic shielding filter for a plasma display panel using said acrylic adhesive composition for an electro-magnetic shielding film.

ADVANTAGEOUS EFFECTS

Because the electro-magnetic shielding filter of the present invention is transparentized with an acrylic adhesive composition having no acidic groups, oxidation of copper is prevented, which improves durability and prevents discoloration of the electro-magnetic shielding filter.

BEST MODE

Hereinafter, the present invention is described in more detail referring to the attached drawings.

Figure 2A:
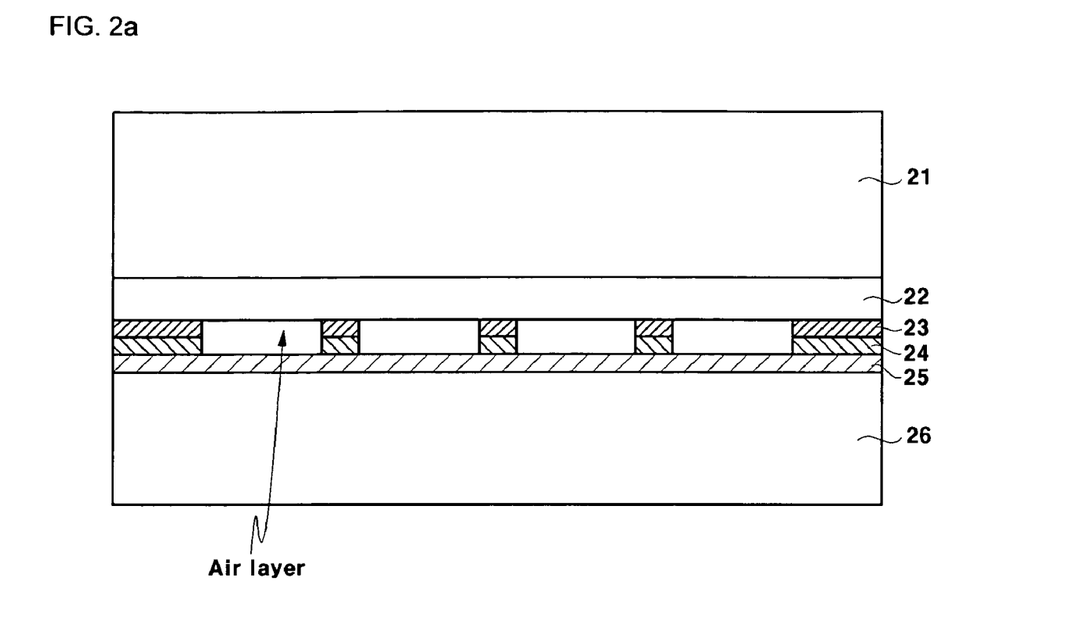
FIGS. 2a and 2b show cross-sections of an electro-magnetic shielding film before and after transparentization.

As seen in FIG. 2a, an electro-magnetic shielding film before transparentization comprises layers of copper foil 23, black screen 24, adhesive 25, and transparent substrate 26 from the top side down. An air layer is formed when the transparent substrate 21 such as an antireflection film is glued to the copper foil 23. The difference in refractive indices of this air layer and the transparent substrate 21, which is made of polymer film, causes scattering of light emergent from the plasma display panel, thereby reducing visibility.

Figure 2B:
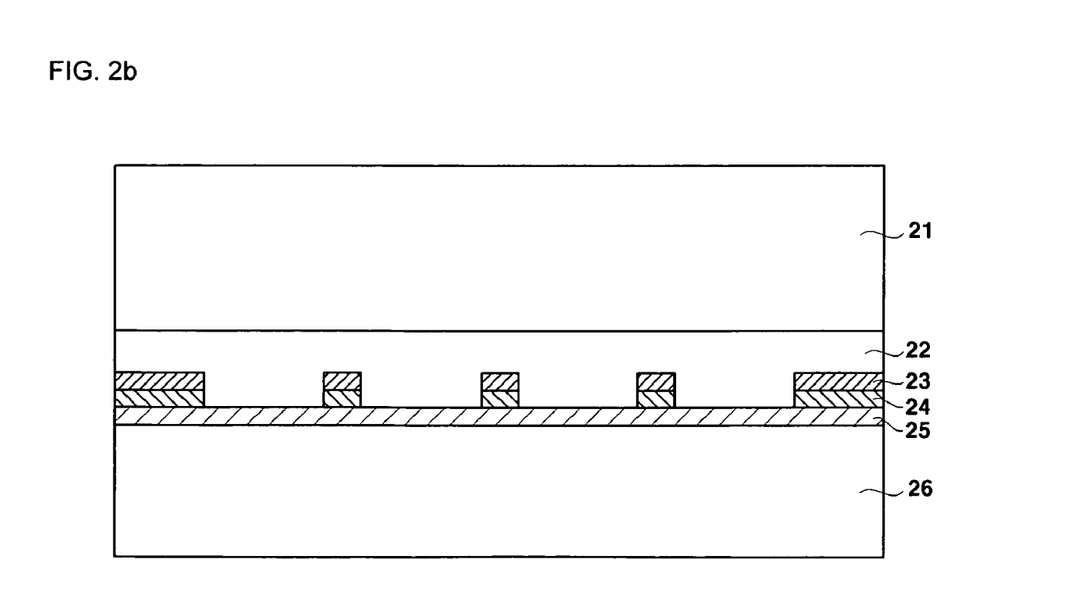

Accordingly, a crosslinking agent, UV or EB, is used to crosslink the adhesive composition and therefore remove the air layer, as seen in FIG. 2b. This process of removing the air layer is called transparentization.

If the adhesive used in the adhesive composition for the electro-magnetic shielding film of the present invention has too low elasticity because of too low crosslinking density or molecular weight, air bubbles may form at high temperature, which may cause scattering. Otherwise, if an adhesive having too large elasticity is used for a long time, excessive crosslinkage may cause peeling of layers. Since viscoelasticity of an adhesive is mainly dependent on molecular weight, molecular weight distribution, or molecular structure of the polymer chain, and particularly molecular weight, it is preferable to use an acrylic polymer having a molecular weight ranging from 300,000 to 2,000,000. Said adhesive may be prepared by conventional radical copolymerization.

To be more specific, the acrylic adhesive composition for the electro-magnetic shielding film preferably comprises:

a) 100 parts by weight of an acrylic copolymer of:
 i) 90 to 99.9 parts by weight of (meth)acrylate ester monomers having $C_1$ to $C_{12}$ alkyl groups; and
 ii) 0.1 to 10 parts by weight of vinylic monomers having hydroxyl groups; and b) 0.01 to 10 parts by weight of a multifunctional isocyanate crosslinking agent.

More preferably, said (meth)acrylate ester monomers having $C_1$ to $C_{12}$ alkyl groups are comprised at 94 to 99.9 parts by weight for 100 parts by weight of said acrylic copolymer. If the content is below 90 parts by weight, initial adhesivity becomes poor and cost increases.

Preferably, for said (meth)acrylate ester monomers having $C_1$ to $C_{12}$ alkyl groups, an alkyl ester of acrylate (or methacrylate) having one to twelve carbon atoms and preferably having two to eight carbon atoms, is used. Preferably, said alkyl(meth)acrylate has two to eight carbon atoms in the alkyl groups because cohesiveness of the adhesive reduces if the alkyl groups are too long. To be specific, butyl(meth)acrylate, 2-ethylhexyl(meth)acrylate, ethyl(meth)acrylate, methyl(meth)acrylate, n-propyl(meth)acrylate, isopropyl(meth)acrylate, t-butyl(meth)acrylate, pentyl(meth)acrylate, n-octyl(meth)acrylate, or isononyl(meth)acrylate may be used.

Also, such monomers as acrylonitrile, styrene, glycidyl (meth)acrylate, and vinyl acetate may be used to control the glass transition temperature of the adhesive or offer other properties.

Said vinylic monomers having hydroxyl groups are used to offer cohesiveness, so that the adhesive is not damaged at high temperature, through reaction with said multifunctional isocyanate crosslinking agent. Preferably, said vinylic monomers are comprised at 0.1 to 10 parts by weight for 100 parts by weight of said acrylic copolymer. If the content is below 0.1 part by weight, the adhesive may be easily damaged at high temperature. Otherwise, if it exceeds 10 parts by weight, fluidity at high temperature may decrease.

For said vinylic monomers having hydroxyl groups, 2-hydroxyethyl(meth)acrylate, 2-hydroxypropyl(meth)acrylate, 2-hydroxyethyleneglycol(meth)acrylate, or 2-hydroxypropyleneglycol(meth)acrylate may be used.

Preferably, said multifunctional isocyanate crosslinking agent is comprised at 0.01 to 10 parts by weight for 100 parts by weight of said acrylic copolymer. If the content is below 0.01 part by weight, crosslinkage becomes insufficient. Otherwise, if it exceeds 10 parts by weight, peeling of layers may occur due to excessive crosslinkage.

Said multifunctional isocyanate crosslinking agent maintains cohesiveness of the adhesive at high temperature through crosslinkage, and therefore improves adhesion reliability. For said multifunctional isocyanate crosslinking agent, tolylene diisocyanate, diphenylmethane diisocyanate, hexamethylene diisocyanate, or a trimethylolpropane adduct of tolylene diisocyanate may be used. Said multifunctional isocyanate crosslinking agent does not cause crosslinkage of isocyanate groups during formation of the adhesive layer, which enables uniform coating. After the coating process is completed, a crosslinkage is formed while passing through drying and aging processes. Resultantly, an adhesive layer with improved cohesiveness is obtained. The improved cohesiveness improves physical properties and cuttability of the adhesive.

Also, a silane coupling agent may be added to improve adhesion durability. Said silane coupling agent improves adhesivity with time and heat, and thereby prevents air bubbling and peeling under high temperature and high humidity, and enhances durability and reliability. Preferably, said silane coupling agent is comprised at 0.01 to 10 parts by weight for 100 parts by weight of said acrylic copolymer. If the content is below 0.01 part by weight, improvement of adhesivity with time and heat is only slight. Otherwise, if it exceeds 10 parts by weight, air bubbling or peeling may occur, which reduces durability and reliability.

For said silane coupling agent, β-(3,4-epoxycyclohexyl) ethyltrimethoxysilane, γ-glycidoxypropyltrimethoxysilane, γ-glycidoxypropylmethyldiethoxysilane or γ-glycidoxypropyltriethoxysilane may be used.

In addition, 1 to 100 parts by weight of an adhesive resin may be used to improve adhesivity. However, if said adhesive resin is used excessively, cohesiveness of the adhesive may be reduced. For said adhesive resin, (hydrated) hydrocarbon resin, (hydrated) rosin resin, (hydrated) rosin ester resin, (hydrated) terpene resin, (hydrated) terpene phenol resin, polymeric rosin resin, or polymeric rosin ester resin may be used.

In the present invention, said acrylic copolymer may be polymerized by solution polymerization, photopolymerization, bulk polymerization, suspension polymerization, or emulsion polymerization, and preferably by solution polymerization. Preferably, the polymerization temperature is 50 to 140° C., and an initiator is added when the monomers are mixed uniformly.

Preferably, the acrylic adhesive resin for the electro-magnetic shielding film of the present invention has a crosslinking density ranging from 1 to 95%.

The acrylic adhesive resin for the electro-magnetic shielding film composition of the present invention may be prepared by well-known photopolymerization curing by selecting an appropriate photoinitiator. The acrylic adhesive resin composition of the present invention can be used for polarizers, optical functional films, optical control films, etc. Also, it can be used for industrial sheets including reflective sheets, structural adhesive sheets, photographical adhesive sheets, adhesive sheets for drawing traffic lanes, optical adhesives, and adhesives for electronic devices.

During transparentization of the acrylic adhesive composition for the electro-magnetic shielding film of the present invention, it is preferable to dilute the acrylic adhesive composition with an organic solvent before coating to improve its coating characteristics.

Preferably, a multifunctional crosslinking agent is added as the crosslinking agent. More preferably, an isocyanate crosslinking agent, epoxy crosslinking agent, aziridine crosslinking agent, or metal chelate crosslinking agent is added. For said isocyanate crosslinking agent, tolylene diisocyanate, diphenylmethaneisocyanate, or hexamethylene diisocyanate may be used.

Said multifunctional isocyanate crosslinking agent does not cause crosslinkage of isocyanate groups during formation of the adhesive layer, which enables uniform coating. After the coating process is completed, a crosslinkage is formed while passing through drying and aging processes. Resultantly, an adhesive layer with improved cohesiveness is obtained. The improved cohesiveness improves such physical properties as durability, reliability, adhesivity, and cuttability of the adhesive.

The crosslinking may be attained using UV or EB, not using a crosslinking agent.

The acrylic adhesive composition for the electro-magnetic shielding film of the present invention may further comprise a near infrared ray absorbent, epoxy resin, curing agent, silane coupling agent, plasticizer, UV stabilizer, antioxidant, dye, reinforcing agent, or filler, if required.

Durability of the electro-magnetic shielding film after transparentization is tested by exposing it under a high temperature of 80% for 500 hours or under 60° C. and RH (relative humidity) of 90% for 500 hours, and measuring transmittivity change before and after exposure. The larger the transmittivity change, the less the durability.

If transparentization is performed using the adhesive prepared by using an acrylic copolymer having acidic groups, the residual acidic groups oxidize copper, which turns blue. Resultantly, transmittivity of the electro-magnetic shielding film is significantly reduced and durability of the electro-magnetic shielding film is reduced as well.

However, in the present invention, the air layer is removed by crosslinkage using the adhesive composition for the electro-magnetic shielding film. Therefore, the transparentization process is simple. Also, because acryl monomers having no acidic groups are used, oxidation of copper is prevented after crosslinkage. Accordingly, transmittivity of the electro-magnetic shielding film changes little even under high temperature or high humidity, thereby improving durability.

Figure 3:
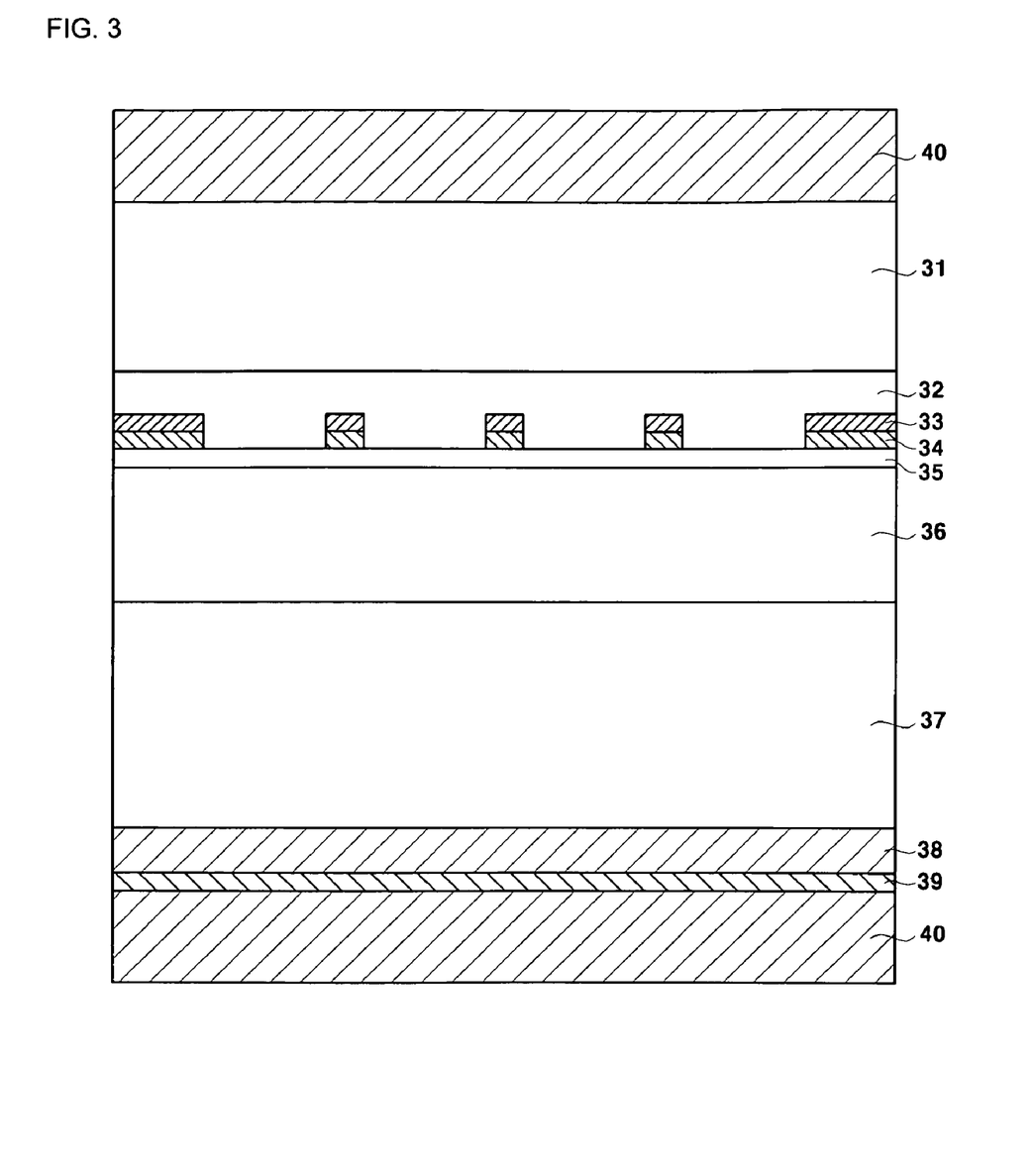
FIG. 3 shows the cross-section of a electro-magnetic shielding filter of a plasma display panel.
Figure 4A:
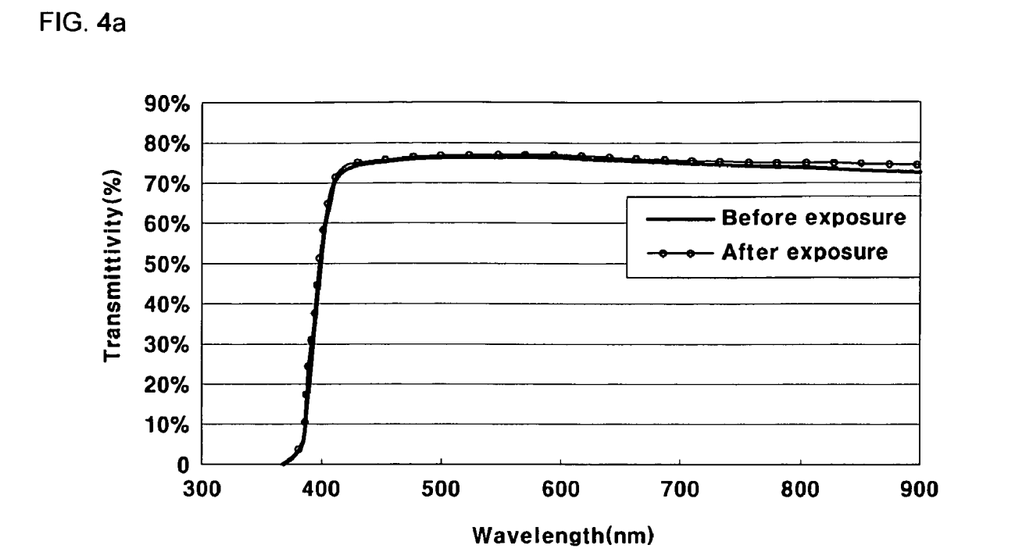
FIGS. 4a to 4d show transmittivity measurement results for Examples 1 to 3 and Comparative Example 1 before and after a durability test.
Figure 4B:
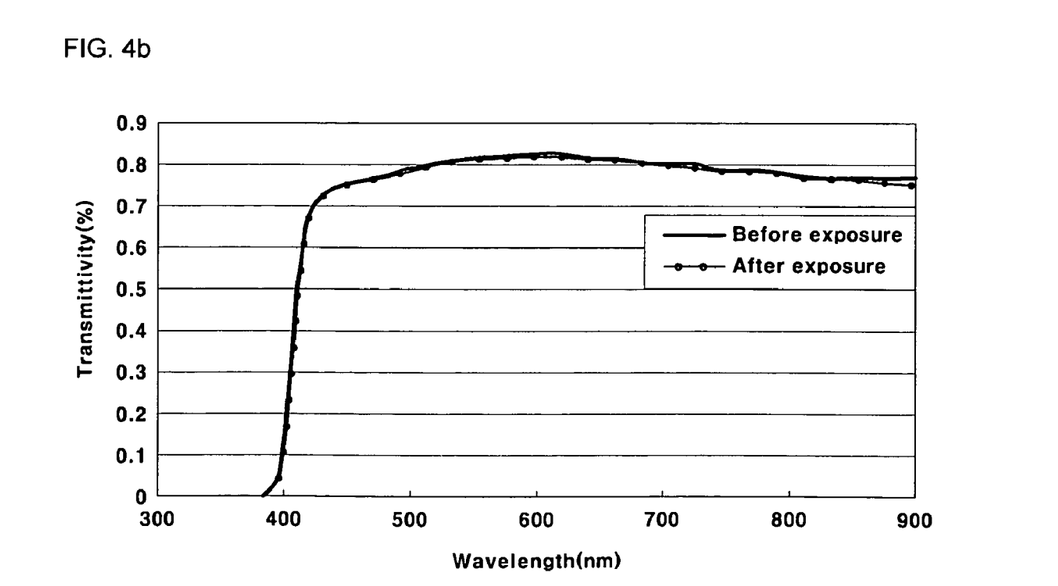
Figure 4C:
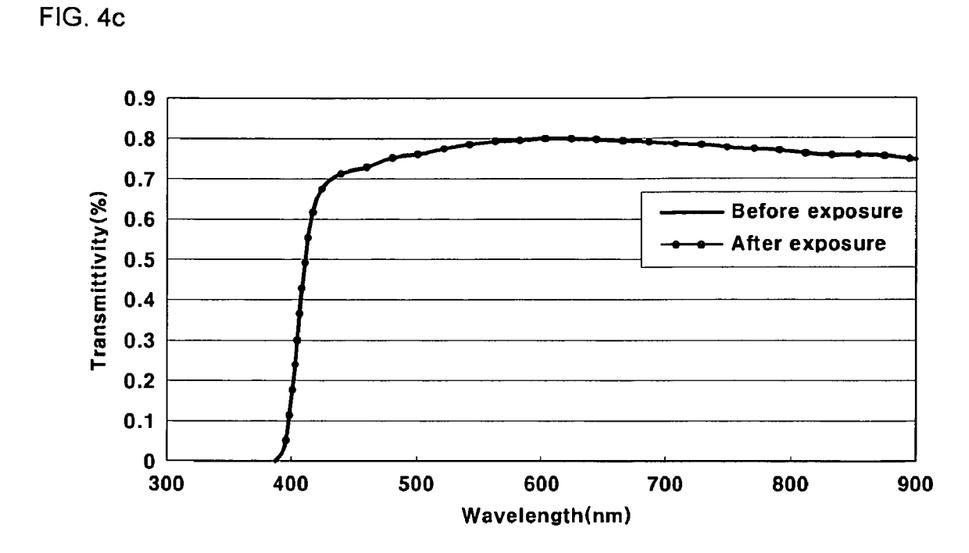
Figure 4D:
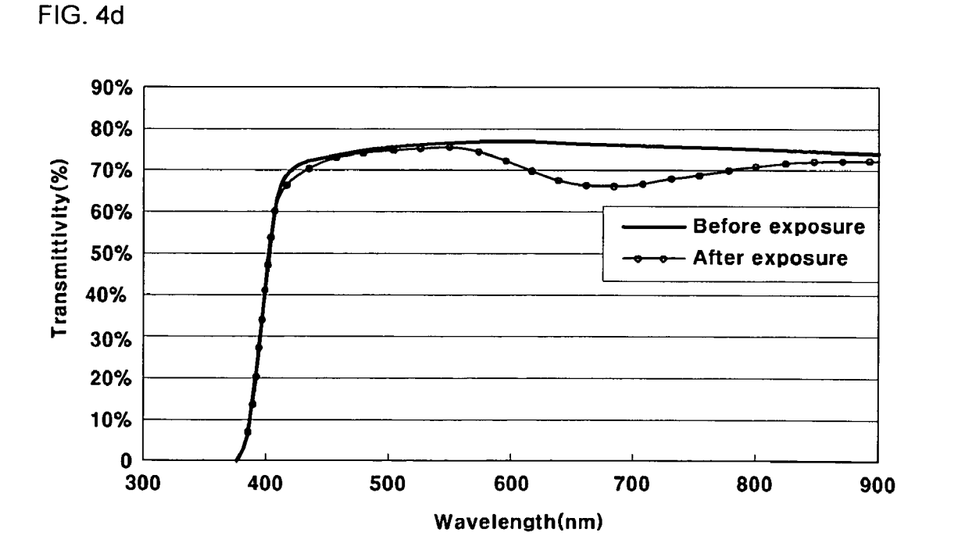

The present invention also provides a plasma display panel electro-magnetic shielding filter manufactured by laminating layers of reinforcing glass 37, a color correction layer 38, and a near infrared ray shielding layer 39 below the transparent substrate 36 of the electro-magnetic shielding film, on which layers of copper foil 33, black screen 34, and adhesive 35 are laminated, and laminating antireflection films 40 below the near infrared ray shielding layer 39 and on top of the adhesive layer 32. Another transparent substrate 31 may be laminated below the antireflection film 40.

Because vinylic monomers having hydroxyl groups but having no acidic groups are used in the adhesive composition for the electro-magnetic shielding filter of the present invention, oxidation of copper is prevented even under high temperature and high humidity, which reduces transmittivity of the electro-magnetic shielding filter and improves durability of the plasma display panel.

Hereinafter, the present invention is described in more detail through examples and a comparative example. However, the following examples and comparative example are only for the understanding of the present invention, and the present invention is not limited by the following examples.

Example 1

Preparation of Acrylic Copolymer

A monomer mixture comprising 98 parts by weight of n-butylacrylate (BA) and 2 parts by weight 2-hydroxyethyl (meth)acrylate (2-HEMA) was put in a 1,000 cc reactor equipped with nitrogen reflux and cooling units. Then, 100 parts by weight of ethyl acetate (EAc) were added as a solvent. After the reactor was purged with nitrogen gas for 20 minutes to remove oxygen, the temperature was set at 60%. Then, 0.03 parts by weight of azobisisobutyronitrile (AIBN) diluted to 50% in ethyl acetate was added as an reaction initiator. Reaction was performed for 8 hours to prepare an acrylic copolymer (PA-1) having a molecular weight of 1,500 K (measured with standard polystyrene sample).

(Preparation of Acrylic Adhesive Composition)

1.5 parts by weight of a tolylene diisocyanate adduct of trimethylolpropane (TDI-1) diluted to 10 wt % in ethyl acetate was added for 100 parts by weight of the prepared acrylic copolymer (PA-1) as a multifunctional isocyanate crosslinking agent. The resultant mixture was diluted to an appropriate concentration considering the coating characteristics, and mixed uniformly. Then, it was coated on a 38 μm-thick releasing film and dried to prepare a uniform adhesive layer measuring 30 μm.

Transparentization of the electro-magnetic shielding film was performed using the prepared adhesive layer.

Example 2

The procedure of Example 1 was performed except for using 2-hydroxypropyl(meth)acrylate instead of 2-hydroxyethyl(meth)acrylate (2-HEMA).

Example 3

Preparation of Acrylic Copolymer

An acrylic copolymer (PA-2) having a molecular weight of 1,000 K (measured with standard polystyrene sample) was prepared in the same manner of Example 1 using a monomer mixture comprising 94 parts by weight of n-butylacrylate (BA) and 6 parts by weight of 2-hydroxyethyl(meth)acrylate (2-HEMA), and 0.04 part by weight of azobisisobutyronitrile (AIBN) diluted to 50% in ethyl acetate as a reaction initiator.

(Preparation of Acrylic Adhesive Composition)

The procedure of Example 1 was performed except for using PA-2 as acrylic copolymer.

Comparative Example 1

Preparation of Acrylic Copolymer

A monomer mixture comprising 94 parts by weight of n-butylacrylate (BA) and 6 parts by weight acrylate (acetic acid) was put in a 1,000 cc reactor equipped with nitrogen reflux and cooling units. Then, 100 parts by weight of ethyl acetate (EAc) were added as solvent. After the reactor was purged with nitrogen gas for 20 minutes to remove oxygen, the temperature was set at 60%. Then, 0.04 parts by weight of azobisisobutyronitrile (AIBN) diluted to 50% in ethyl acetate was added as a reaction initiator. The reaction was performed for 8 hours to prepare an acrylic copolymer (PA-3) having a molecular weight of 1,000 K (measured with standard polystyrene sample).

(Preparation of Acrylic Adhesive Composition)

1.5 parts by weight of a tolylene diisocyanate adduct of trimethylolpropane (TDI-1) diluted to 10 wt % in ethyl acetate was added for 100 parts by weight of the prepared acrylic copolymer (PA-3) as a multifunctional isocyanate crosslinking agent. The resultant mixture was diluted to an appropriate concentration considering the coating characteristics, and mixed uniformly. Then, it was coated on a 38 μm-thick releasing film and dried to prepare a uniform adhesive layer measuring 30 μm.

Transparentization of the electro-magnetic shielding film was performed using the prepared adhesive layer.

(Evaluation of Durability)

Each adhesive composition prepared in Examples 1 to 3 and Comparative Example 1 was treated on an electro-magnetic shielding film. After transparentization, transmittivity was measured in a wavelength range of 300 nm to 900 nm. After exposure under 60° C. and RH 90% for 500 hours, transmittivity was measured again. The transmittivity measurement results are shown in FIGS. 4a to 4d. Transmittivity change at 680 nm is shown in the following Table 1.

TABLE 1

|  | Transmittivity before exposure | Transmittivity after exposure | Transmittivity change (%) |
| --- | --- | --- | --- |
| Example 1 | 76.5 | 76.5 | 0 |
| Example 2 | 80.6 | 80.1 | 0.5 |
| Example 3 | 79.4 | 79.0 | 0.4 |
| Comparative Example 1 | 76.5 | 67.3 | 9.2 |

As seen in FIGS. 4a to 4d and Table 1, electro-magnetic shielding films transparentized with acrylic adhesive compositions of Example 1 to 3, which have no acidic groups, showed little transmittivity change before and after exposure. On the other hand, the electro-magnetic shielding film transparentized with the adhesive composition of Comparative Example 1, which has acidic groups (—COOH), experienced a transmittivity change of 9.2%.

From this result, it can be seen that oxidation of copper in the copper foil is prevented if transparentization is performed using the acrylic adhesive composition of the present invention, which has no acidic groups, and therefore there is little transmittivity change even under high temperature and high humidity, thereby improving durability.

While the present invention has been described in detail with reference to the preferred embodiments, those skilled in the art will appreciate that various substitutions and modifications can be made thereto without departing from the spirit and scope of the present invention as set forth in the appended claims.

What is claimed is:

1. An electro-magnetic shielding filter for a plasma display panel transparentized by using an acrylic adhesive composition having a crosslinking density ranging from 1 to 95%, comprising:
    a) 100 parts by weight of an acrylic copolymer of:
        i) 90 to 99.9 parts by weight of (meth)acrylate ester monomers having $C_1$ to $C_{12}$ alkyl groups; and
        ii) 0.1 to 10 parts by weight of vinylic monomers having hydroxyl groups; and
    b) 0.01 to 10 parts by weight of a multifunctional isocyanate crosslinking agent.

2. The electro-magnetic shielding filter for a plasma display panel of claim 1, wherein said (meth)acrylate ester monomers having $C_1$ to $C_{12}$ alkyl groups are one or more members selected from the group consisting of butyl(meth)acrylate, 2-ethylhexyl(meth)acrylate, ethyl(meth)acrylate, methyl(meth)acrylate, n-propyl(meth)acrylate, isopropyl(meth)acrylate, t-butyl(meth)acrylate, pentyl(meth)acrylate, n-octyl(meth)acrylate, and isononyl(meth)acrylate.

3. The electro-magnetic shielding filter for a plasma display panel of claim 1, wherein said vinylic monomers having hydroxyl groups are one or more members selected from the group consisting of 2-hydroxyethyl(meth)acrylate, 2-hydroxypropyl(meth)acrylate, 2-hydroxyethyleneglycol(meth)acrylate, and 2-hydroxypropyleneglycol(meth)acrylate.

4. The electro-magnetic shielding filter for a plasma display panel of claim 1, wherein said multifunctional isocyanate crosslinking agent is one or more members selected from the group consisting of tolylene diisocyanate, diphenylmethane diisocyanate, hexamethylene diisocyanate, and a trimethylolpropane adduct of tolylene diisocyanate.

5. The electro-magnetic shielding filter for a plasma display panel of claim 1, wherein said vinylic monomers having hydroxyl groups react with isocyanate groups of said multifunctional isocyanate crosslinking agent to form a partial crosslinkage.

6. The electro-magnetic shielding filter for a plasma display panel of claim 1, which further comprises one or more additives selected from the group consisting of a near infrared ray absorbent, epoxy resin, curing agent, silane coupling agent, plasticizer, UV stabilizer, antioxidant, dye, reinforcing agent, and filler.

7. The electro-magnetic shielding filter for a plasma display panel of claim 6, wherein said silane coupling agent is one or more selected from the group consisting of β-(3,4-epoxycyclohexyl)ethyltrimethoxysilane, γ-glycidoxypropyltrimethoxysilane, γ-glycidoxypropylmethyldiethoxysilane, and γ-glycidoxypropyltriethoxysilane, and is used at 0.01 to 10 parts by weight for 100 parts by weight of said acrylic copolymer.

8. The electro-magnetic shielding filter for a plasma display panel of claim 1, wherein said adhesive composition further comprises 1 to 100 parts by weight of an adhesive resin for 100 parts by weight of said acrylic copolymer, which is selected from the group consisting of hydrocarbon resin or hydrated hydrocarbon resin, rosin resin or hydrated rosin resin, rosin ester resin or hydrated rosin ester resin, terpene resin or hydrated terpene resin, terpene phenol resin or hydrated terpene phenol resin, polymeric rosin resin, and polymeric rosin ester resin.

9. The electro-magnetic shielding filter for a plasma display panel of claim 1, wherein said acrylic copolymer is prepared by solution polymerization, photopolymerization, bulk polymerization, suspension polymerization, or emulsion polymerization.

* * * * *